(12) United States Patent
Miefalk et al.

(10) Patent No.: US 7,188,754 B2
(45) Date of Patent: Mar. 13, 2007

(54) AUTOMATIC DOSING DEVICE AND THE USE OF SUCH AN AUTOMATIC DOSING DEVICE

(75) Inventors: Hakan Miefalk, Jarfalla (SE); Linda Menrik, Hagersten (SE)

(73) Assignee: Electrolux Home Products Corporation N.V., Zaventem (BE)

( * ) Notice: Subject to any disclaimer, the term of this patent is extended or adjusted under 35 U.S.C. 154(b) by 445 days.

(21) Appl. No.: 10/481,899

(22) PCT Filed: Apr. 4, 2003

(86) PCT No.: PCT/SE03/00549

§ 371 (c)(1),
(2), (4) Date: Dec. 23, 2003

(87) PCT Pub. No.: WO03/093559

PCT Pub. Date: Nov. 13, 2003

(65) Prior Publication Data

US 2004/0188467 A1    Sep. 30, 2004

(30) Foreign Application Priority Data

Apr. 29, 2002    (SE) .................................... 0201312

(51) Int. Cl.
*G01F 11/20*    (2006.01)
(52) U.S. Cl. ........................... 222/413; 222/52; 222/63; 222/64; 222/156; 222/236; 222/241
(58) Field of Classification Search ........ 222/156–158, 222/412–413, 240–241, 181.1, 236, 185.1, 222/410, 52, 58, 63, 64, 333, 145.5, 145.6; 366/118

See application file for complete search history.

(56) References Cited

U.S. PATENT DOCUMENTS

| 4,207,995 | A |   | 6/1980  | Neely |
|-----------|---|---|---------|-------|
| 4,429,817 | A | * | 2/1984  | Ikeda ........................... 222/652 |
| 4,461,405 | A | * | 7/1984  | Adamson ..................... 222/201 |
| 4,779,430 | A | * | 10/1988 | Thuruta et al. ............. 68/12.04 |
| 4,917,272 | A | * | 4/1990  | Ikeda ........................... 222/231 |
| 4,934,563 | A | * | 6/1990  | Torita et al. .................. 222/14 |
| 4,989,761 | A | * | 2/1991  | Ikeda ........................... 222/231 |
| 5,063,757 | A |   | 11/1991 | Ideka et al. |

FOREIGN PATENT DOCUMENTS

| DE | 4204736 A1 | 10/1992 |
|----|-----------|---------|
| EP | 1101431 A1 | 5/2001 |

* cited by examiner

*Primary Examiner*—Frederick C. Nicolas
(74) *Attorney, Agent, or Firm*—Pearne & Gordon LLP

(57) ABSTRACT

The present invention refers to an automatic dosing device. The purpose of the device is to store and dose material, kept inside a container part, and to make it possible for an operator to refill the container with material. The automatic dosing device therefore comprises a refilling container (1), a dosing screw (5), a control system, a driving motor and a guiding mechanism (14–16, 19). The container (1) stores the material, the screw (5) doses it out of the container (1), the system controls the dosing and the mechanism (14–16, 19) guides the container between an inner position where the device can dose material and an outer position where an operator is allowed to refill it with material. The automatic dosing device could preferably be used with a laundry washing machine but there is also possibilities to use the automatic dosing device in another machine that requires an easy handle automatic dosing device.

18 Claims, 3 Drawing Sheets

AUTOMATIC DOSING DEVICE AND THE USE OF SUCH AN AUTOMATIC DOSING DEVICE

This application claims the benefit of International Application Number PCT/SE03/00549, which was published in English on Nov. 13. 2003.

TECHNICAL FIELD

The present invention refers to an automatic dosing device. The purpose of the device is to store and dose material, kept inside a container part, and to make it possible for an operator to refill the container with material. The automatic dosing device therefore comprises a refilling container, a dosing screw, a control system, a driving motor and a guiding mechanism. The container stores the material, the screw doses it out of the container, the system controls the dosing and the mechanism guides the container between an inner position where the device can dose material and an outer position where an operator is allowed to refill it with material.

BACKGROUND OF THE INVENTION

Automatic dosing devices for different types of machines have since long been a target for manufactures. These devices shall be able to dose powder, liquid or other kinds of material from a container into a process. Therefore a various amount of dosing devices have been developed. Mostly these devices are developed for industrial use. They are therefore often quite expensive and/or complex constructions.

Recently there has been more focus on designing automatic dosing devices for household or at least cheaper appliances. Especially for laundry washing machines there is a large interest in achieving simple and reliable devices. Conventionally, such automatic dosing devices for dispensing a detergent into a washing tub has been proposed. The detergent is stored in a container and dispensed from a discharge at the outlet of the container. In order to avoid that vibrations causes detergent to fall out from the container at other occasions than when the detergent is to be dispensed, several proposed dosing devices have a discharge mechanism which is able to both dose and close the outlet.

U.S. Pat. No. 5,063,757 proposes a detergent dispenser with this kind of dosing and closing mechanism. The dispenser includes a detergent container with a lower discharge outlet from which stored detergent is discharged and a detergent fall preventing member displaced in the outlet in order to close the outlet when detergent is not dosed. The dosing is achieved by a helical coil/screw arranged is a discharge passageway. An agitating member is disposed in the detergent container in order to avoid clogging of the detergent. The helical coil or screw and the agitating member are rotated by an electric motor mounted together with the container. The container, with an outer and inner casing, is detachably mounted to the machine by claws.

Although the construction is developed to be detachably mounted inside a machine it has drawbacks. The detaching mechanism demands a careful handling by the operator. The container and other parts also have to be clean to co-operate with the machine and in order to be fixed by the claws. Since the motor is placed with the container it is more expensive to have more than one dispenser for a machine. The container is also designed such that it makes it is difficult to fit in a space inside a washing machine in a proper way. Finally it is also important to create a construction as simple and cheap as possible, which means fewer and simpler parts than in this construction.

The present invention has been made with a view toward overcoming the above drawbacks of the prior art. The first object of the present invention is therefore to provide an automatic dosing device as a detergent dispenser that is easy to integrate in a proper way in a machine and easy to handle by an operator. In order to achieve that the device has means for exposing the container when necessary and hide it when not. A second object of the present invention is to provide a device that doses more or less automatically. In order to achieve that the device has a control unit and possibilities to read in information from which the device is controlled. A third object of the present invention is to achieve a cheap device that is simple to manufacture. In order to achieve that the device has few simple parts in cheap, reliable material. The device is mainly designed for a laundry washing machine but the principle idea shall be applicable for any kind of machine which requires an automatic dosing device. The solution of this present invention is achieved according to the features disclosed in claim 1.

According to the present invention an automatic dosing device for storing and automatically dosing stored material into a process is achieved. The device has a refill container, a dosing screw, a driving motor, a control system and a guiding mechanism. The container stores the material, the screw doses it out of the container, the system controls the dosing and the mechanism guides the container between an inner position where the device can dose material and an outer position where an operator is allowed to refill it with material.

DESCRIPTION OF DRAWINGS

The invention will be described in form of a preferred embodiment by making reference to the accompanying drawings, in which.

AN ILLUSTRATIVE PREFERRED EMBODIMENT

Figure 1:
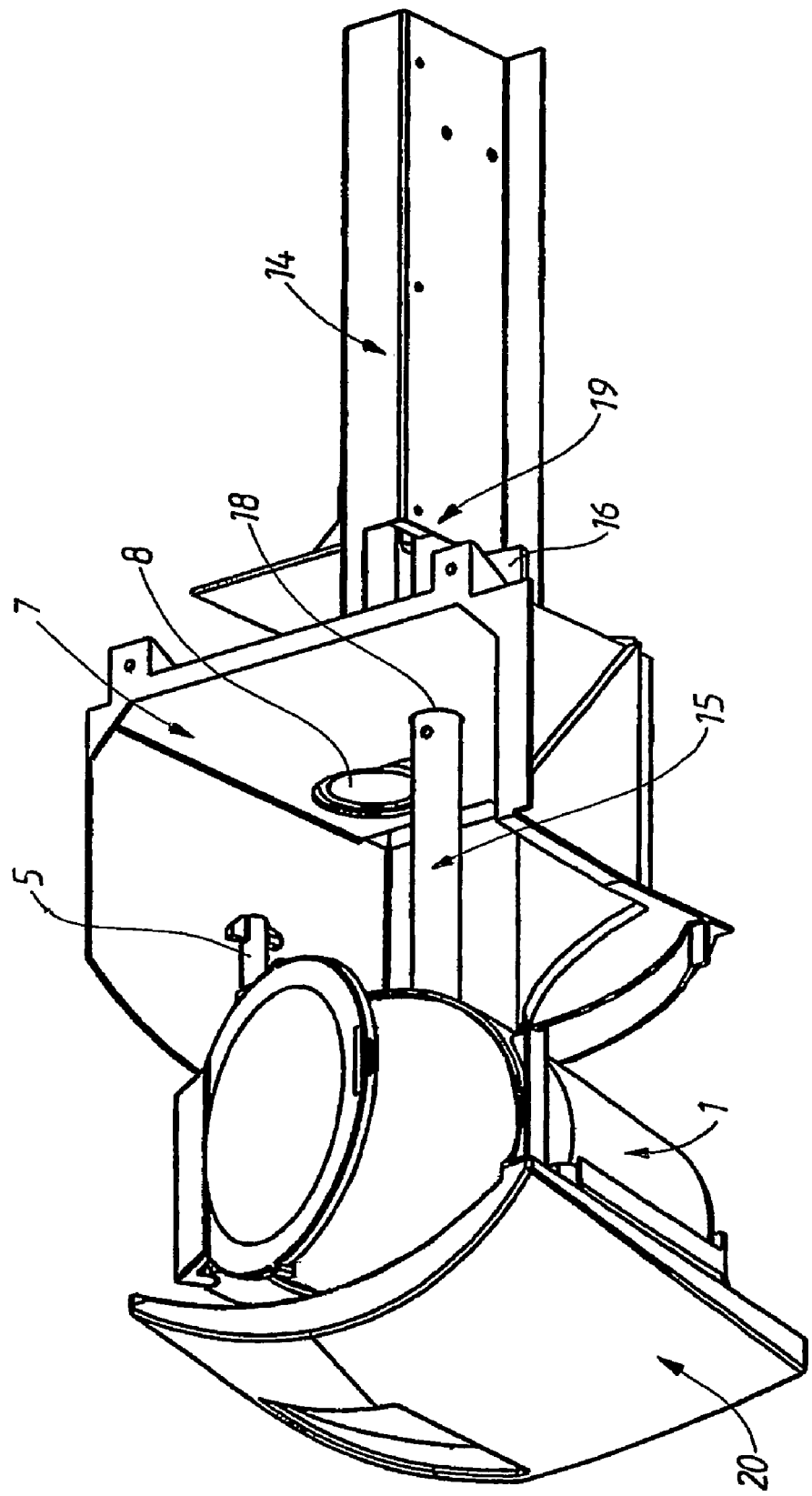
FIG. 1 is a perspective view of an automatic dosing device according to the present invention.

The automatic dosing device is a dosing device for laundry washing machines, whereby any reference concerning dosing material refers to detergent. The dosing device has a container part 1, which comprises a receptacle 2 in which the detergent is stored and a cover 3. A handle 4 serves as a locking means for the cover. One end of a dosing screw 5 extends out of the receptacle and has two wings 6 whose function will be described below. The device comprises a mixer 7, which at its backside has a motor opening 8 and a guiding opening 18. The function of the mixer and the container is explained further below.

Figure 4:
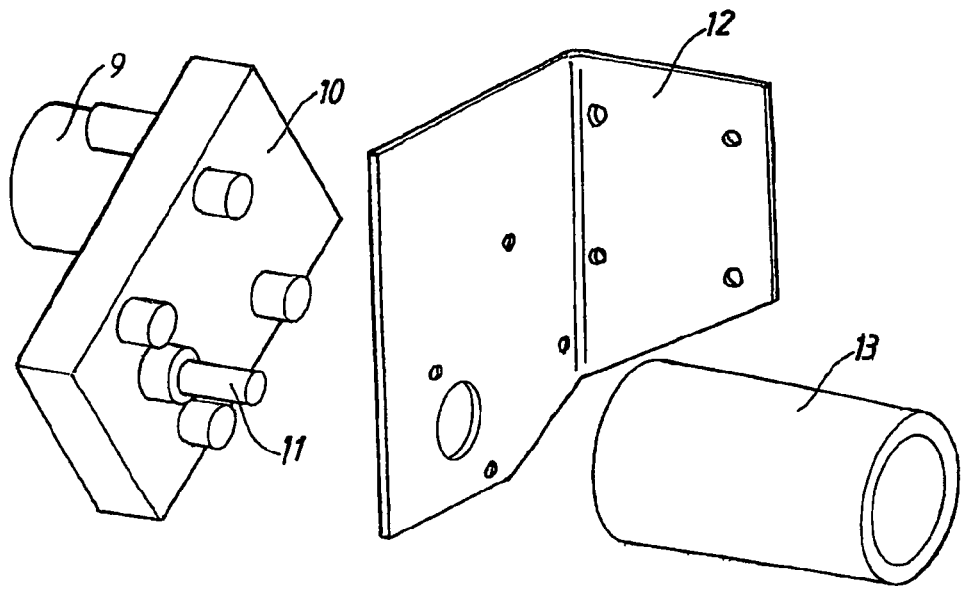
FIG. 4 is an exploded perspective view of a motor part of the present invention according to FIG. 1.
Figure 2:
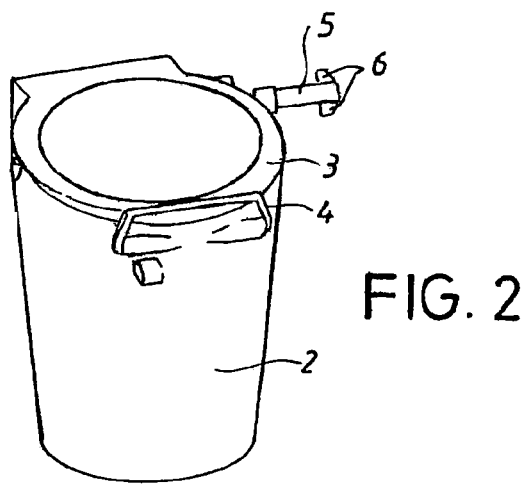
FIG. 2 is a perspective view of a container part of the present invention according to FIG. 1.
Figure 3:
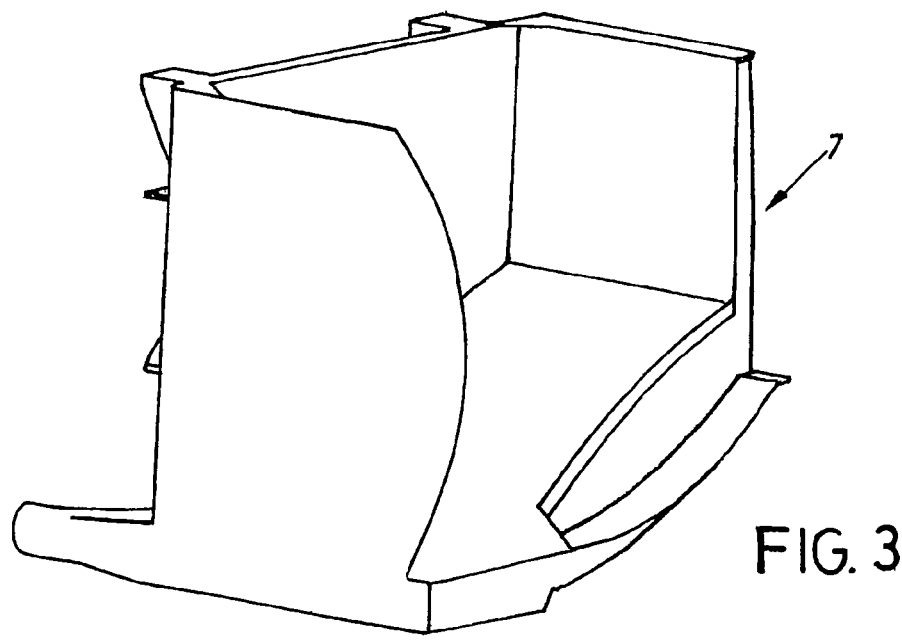
FIG. 3 is a perspective view of a mixer part of the present invention according to FIG. 1.
Figure 5:
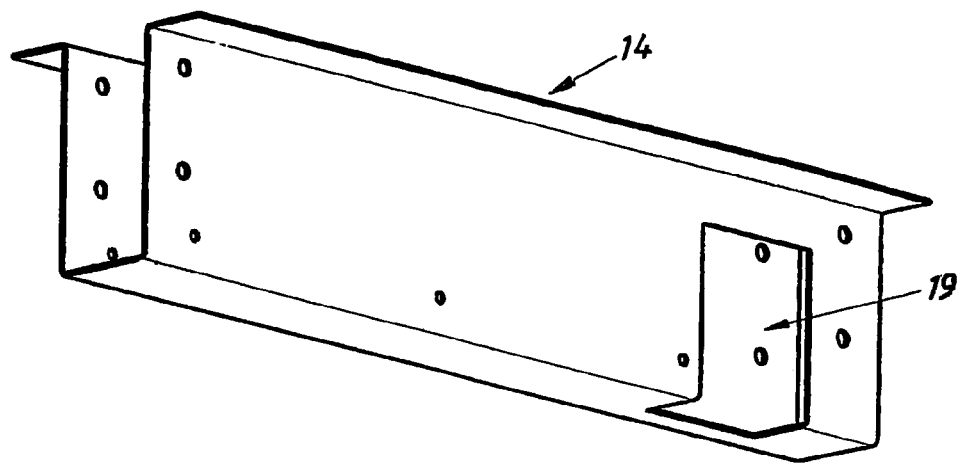
FIG. 5 is a perspective view of a guiding frame of the present invention according to FIG. 1.

A motor opening 8 guides a motor part, see FIG. 4. The motor part has an electric motor 9 with a gear 10. A motor shaft 11 transmits the rotation from the motor to a clutch 13. The clutch is attached to the shaft so as to rotate together with it. A motor bracket 12 that supports the motor pieces is fixed to a guidance frame 14. The function of the motor part is described further below.

Figure 6:
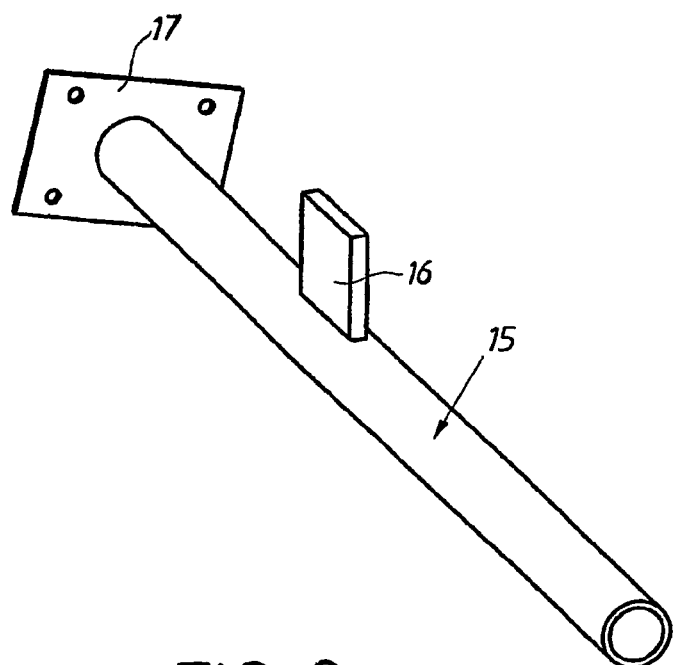
FIG. 6 is a perspective view of a guiding shaft of the present invention according to FIG. 1.

The guiding mechanism comprises the guiding frame 14 and a guiding shaft 15. The shaft, see FIG. 6, has a flat iron piece 16 and a container support 17 attached at one end. The shaft stretches through the guiding opening 18 and the support is attached or detachably attached to the container 1. The frame 14 is U-shaped and comprises an opening 19. A front 20 is a part of the laundry washing machine in which the automatic dosing device is applied. The function of the guiding parts is described further below.

In order to achieve a functional automatic dosing device there is a need for a control, system. An object of this system is to get information about the level of detergent inside the container part 1, in order to indicate when it is time to refill the container and when the container is empty. A first and simple way is to detect the level through a transparent part of the receptacle 2 or the cover 3.

A second way is to use a photo detector with a transmitter of light and an optical sensor as a receiver of light. The transmitter could be arranged in different ways. A first arrangement is to place them on each side of a cavity created inside the container part, the cavity being placed at the lowest point of the container part. When there is no longer detergent between the transmitter and the receiver, which corresponds to a low detergent level inside the container, the light reaches the receiver and the system indicates the low detergent level. A second arrangement is to place a mirror inside the detergent container that reflects the transmitted light towards the receiver. When the detergent reaches a certain lower level the reflected light reaches the receiver and the system indicates a low detergent level. The mirror is placed in a proper way as to achieve the best detecting result of the detergent level.

A third arrangement is to detect if detergent comes out from the container part. The transmitter and receiver are placed at the outlet of the container part and when there is no or little detergent in the outlet the receiver detects the system indicates a low detergent level or problems with the feeding to the outlet.

A forth way is to use a sensor that detects the motion of a moving part arranged to slide inside the container part. When there is a lot of detergent the moving part is forced in a first direction by the detergent. When the detergent level goes down the moving part moves with the level towards the sensor. The sensor is thereby affected and thus detects a signal or similar which corresponds to the amount of detergent left. The sensor could be a Hall effect sensor detecting magnetic fields from the moving part that includes a magnetic piece. The moving part could be equipped with a flange or similar in order to float and move with the detergent surface.

In order to understand the parts described above and how the automatic dosing device works the function of the device will now be described referring to the above mentioned information and the figures. The device according to the preferred embodiment is also intended to work with a control system, whereby the function of this system also is described. The aim of the dosing device, is to attain a device that solves the above mentioned objects. That is a device, which is easy to refill and work with and that is cheap with few parts and simple to manufacture. A withdrawal unit includes at least the container part 1 and the screw 5. According to FIG. 1 the guiding mechanism 14–16 and 19 has as a task to guide the withdrawal unit, including the container part 1, between an outer position away from the mixer 6 and an inner position inside the mixer, not shown. In its outer position the flat iron piece 16 is in a position pointing out through the opening 19, see FIG. 1. This makes it possible to turn the container part and its front into the upright position shown in FIG. 1. Is this position the container cover 3 can be opened and detergent filled into the receptacle 2.

When this is done the cover 3 is closed and locked by the handle 4. The operator thereafter turns the container part 1 in an anti-clockwise direction (seen from the left side in FIG. 1) until the iron piece 16 hits the inner wall of the guiding frame 14. The operator then moves the horizontal container part towards the mixer 7, guided by the guiding mechanism. By the shape of the mixer the conical shaped container part is finally guided into the inner position inside the mixer. During this final movement the dosing screw end moves towards the motor opening 8, in which the clutch 13 is positioned. The wings 6 and the clutch 13 design (not shown) co-operates to guide the screw 5 into turning engagement with the shaft 11. The motor 9 is thereby in turning engagement with the dosing screw 5. The front 20 as a part of the washing machine finally keeps the container in its inner position.

When the machine is started the motor rotates whenever detergent needs to be dispensed out of the container part by the screw. The control system detects if there is enough detergent in the container part 1, see above. If there is enough detergent the screw doses detergent out to the mixer 7. The mixer also comprises a water inlet (not shown), which fills water into the mixer a little while before detergent is dosed, during the dosing and a little while afterwards. The water and detergent are mixed inside the mixer and flows further towards the washing tub.

The control system needs some information in order to control the washing and dosing and achieve a right detergent concentration. The object of this system is therefore to get information about the amount of laundry, water and the washing program and by means of these parameters achieve the rights detergent concentration. In order to achieve that the system is suggested to use one of these solutions. A first solution is to use an interface by which the operator can program at least some of this information. This is a normal procedure and it does not need any special efforts from the operator. The only new information for the operator to select is the needed amount of detergent.

A second solution in order to achieve a "one button machine" is to use sensors detecting at least one of the parameters: the detergent, the water, the water/material concentration and the amount of laundry. The more information the machine collects by itself the easier it is for the operator. An alternative is to connect the automatic dosing device to a database or memory, for instance on the Internet.

It will be appreciated by those ordinary people skilled in the art that the present invention can be embodied in other specific forms without departing from the spirit or essential character thereof. The present disclosed embodiment is therefore considered in all respect to be illustrative and not restrictive. The appended claims rather than the foregoing description indicate the scope of the invention, and all changes that come within the meaning and range of equivalents thereof are intended to be embraced therein.

An example thereof is the possibilities to use the automatic dosing device in another machine that requires an easy handle dosing arrangement. Such apparatus could be dish washing machines or coffee machines. The scope of the invention is not the machine in which the automatic dosing device is used. Instead it is the handle of material in any suitable form (granules, powder, liquid etc.) in a rough environment in order to achieve the best possible automatic dosing result.

The invention claimed is:

1. An automatic dosing device for a machine comprising a container (1) for dosing a material and a dosing screw (5) that feeds the material out from the container (1), wherein at least one of the container (1) and the screw (5) during feeding is in an inner position partly or completely located inside the machine and that the container (1) and the screw (5), arranged on the container (1), constitutes at least a part of a withdrawal unit which moves between the inner position and an outer position outside the machine, wherein the withdrawal unit is arranged on a guiding member by which the withdrawal unit is guided between the outer position and the inner position.

2. An automatic dosing device according to claim 1 characterized in that the screw (5) is detachably mounted by the container (1).

3. An automatic dosing device according to claim 1 characterized in that the guiding member comprises a turnable shaft (15), which is slideably supported by the machine.

4. An automatic dosing device according to claim 1 characterized in that the withdrawal unit in the inner position is detachably connected to a mixer (7) which mixes the material with liquid fed from a liquid inlet, wherein the material and the liquid are transported from the mixer (7), whereby the withdrawal unit is at least guided by the mixer (7) into the machine or detachably fixed to the machine.

5. An automatic dosing device according to claim 1 characterized in that a motor is arranged inside the machine and includes a clutch (13) and a shaft (11) that engage the screw (5) when the withdrawal unit is moved towards the inner position.

6. An automatic dosing device according to claim 5 characterized in that the motor by a bracket (12) is in a fixed position in relation to the unit.

7. An automatic dosing device according to claim 1 characterized in that the container (1) consists of a transparent window through which an operator can see into the container.

8. An automatic dosing device according to claim 1 characterized in that an electronic control arranged inside the machine controls the dosing device in order to feed a right amount the material and in order to indicate a level of the material in the container (1).

9. An automatic dosing device according to claim 8 characterized in that the electronic control in order to achieve the right amount uses an interface by which an operator can choose/adjust the amount of the material.

10. An automatic dosing device according to claim 8 characterized in that the electronic control in order to achieve the right amount uses by the machine itself collected information about at least one of the following parameters: the material, the liquid, the amount and the use of the material and the liquid, whereby the information might be collected from the internet and/or sensors on the machine.

11. An automatic dosing device according to claim 8 characterized in that the electronic control in order to indicate the level of the material consists of a detector inside the container (1) with a transmitter and a receiver arranged such that the material is in-between sensors blocking a signal transmitted by the transmitter towards the receiver.

12. An automatic dosing device according to claim 11 characterized in that the transmitter and the receiver are placed in a cavity, so that the material blocking the signal at least represents that a certain level of material in the container (1) has not been reached.

13. An automatic dosing device according to any of claim 11 characterized in that the transmitter and the receiver are placed so that the signal is reflected by a mirror and thereafter reaches the receiver, so that the material blocking the signal at least represents that a certain level of the material in the container (1) has not been reached.

14. An automatic dosing device according to claim 11 characterized in that the transmitter and the receiver are placed in an outlet through which the material passes, while being fed out so that the material blocking the signal at least represents that a certain level of the material in the container (1) has not been reached.

15. An automatic dosing device according to claim 8 characterized in that the control device in order to indicate the level of the material consists of a detecting sensor and a moving part which part at least in moves with a surface of the material in relation to the sensor when the container is running empty.

16. An automatic dosing device according to claim 15 characterized in that the detecting sensor is a Hall effect sensor and the moving part comprises a magnetic piece.

17. An automatic dosing device according to claim 1 characterized in that the container (1) has essentially conical shape and in its inner position is placed essentially in a horizontal position and in its outer position is placed essentially in a vertical position with its opening at the top.

18. Use of an automatic dosing device according to claim 1 in a washing machine, a coffee machine or any other type of machine that may require automatic dosing.

* * * * *

UNITED STATES PATENT AND TRADEMARK OFFICE
CERTIFICATE OF CORRECTION

PATENT NO. : 7,188,754 B2 Page 1 of 1
APPLICATION NO. : 10/481899
DATED : March 13, 2007
INVENTOR(S) : Hakan Miefalk and Linda Menrik It is certified that error appears in the above-identified patent and that said Letters Patent is hereby corrected as shown below:

In the Claims:

Column 6, line 18: Please insert the word --the-- before the word "material"

Signed and Sealed this

Nineteenth Day of June, 2007

JON W. DUDAS
*Director of the United States Patent and Trademark Office*